J. D. JENKINS.

Carbureting Air for the Production of Light and Heat.

No. 3,779.

Reissued Dec. 28, 1869.

Witnesses:

Chas. H. Poole.

Saml. J. Marr

Assignee:

Blakey Pilkington by Prindle & Dyer, attys.

N. PETERS, Photo-Lithographer, Washington, D. C.

UNITED STATES PATENT OFFICE.

BLAKEY PILKINGTON, OF OAKLAND, CALIFORNIA, ASSIGNEE, BY MESNE ASSIGNMENTS, OF JAMES D. JENKINS.

IMPROVEMENT IN CARBURETING AIR FOR THE PRODUCTION OF LIGHT AND HEAT.

Specification forming part of Letters Patent No. 73,900, dated January 28, 1868; Reissue No. 3,779, dated December 28, 1869.

*To all whom it may concern:*

Be it known that JAMES D. JENKINS, of Charlestown, in the county of Middlesex, and in the State of Massachusetts, did, on the 28th day of January, 1868, obtain of and from the United States of America certain Letters Patent for and upon Improvements in Carbureting Air Apparatus, which said Letters Patent have been found defective, in that certain mistakes were made in the specification and certain ambiguities exist in the claim thereof, by reason of which said specification and claim do not embrace all the original invention and improvements. Now, therefore, I, BLAKEY PILKINGTON, of Oakland, in the county of Alameda and State of California, assignee of the entire interest in the aforesaid Letters Patent, herewith surrendered, being desirous to reissue the same, have prepared a specification and drawings of the said original invention; and I do hereby declare that the following is a full, clear, and exact description of the same, reference being had to the accompanying drawings, making a part of this specification, in which—

Figure 2:
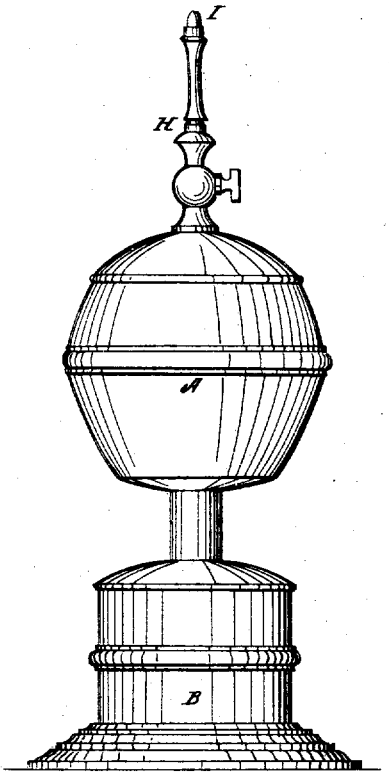
Figure 1:
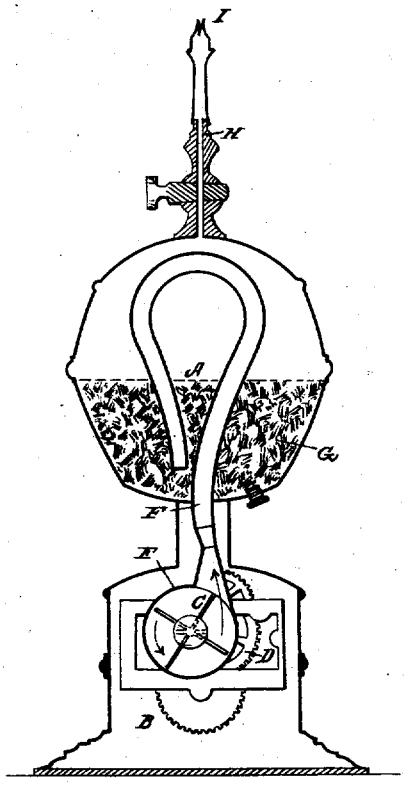

Figure 1 is a vertical central section of the improved apparatus, and Fig. 2 is a side elevation of the same.

Letters of like name and kind refer to like parts in each of the figures.

This invention has for its object the production of light and heat by means of carbureted air; and to this end it consists, principally, in the carbureting of air by driving a current of the same through a metallic chamber filled with absorbent material saturated with gasoline or other carbon oil by means of a fan-blower, as is hereinafter set forth.

It further consists of the apparatus employed, composed of a vessel or chamber filled with absorbent material saturated with gasoline or other carbon fluid, and of a fan-blower for forcing air through said saturated material, as is hereinafter specified.

As the object of this invention is the carbureting of air for lighting or heating purposes, it will be readily seen that in its various applications many varieties and forms of apparatus will be required; but, however, as the principles involved in each of these modifications will be the same, it will only be necessary to describe the construction and operation of one of said modifications in order that said principles may be understood.

In the annexed drawings, A represents a reservoir supported upon and by a hollow base, B, the latter of which contains a fan-blower, C, operated by means of suitable clock-work, D.

Surrounding the fan-blower C is a casing, E, which, extending upward, connects with the lower end of a pipe, F, passing through the bottom of the reservoir A, so that the air set in motion by said fan-blower shall be forced into said reservoir.

The pipe F passes upward from the bottom of the reservoir A to or near the top thereof, and from thence, curving outward and downward, terminates near the bottom of the same. If, now, the reservoir A be filled with absorbent material G, saturated with gasoline or other carbon oil, and the fan-blower C set in motion, the current of air entering said reservoir through the pipe F will be caused to pass upward through said packing G, by means of which it becomes carbureted and ready for use.

From the reservoir A the carbureted air may be conducted to other points; or, if desired, a suitable pipe, H, and burner I may extend upward from said reservoir and the air be consumed as rapidly as carbureted.

The reservoir is intended to contain no more fluid than will be absorbed by the packing, so that there can be no explosion, and thereby one serious objection to this class of devices is removed.

Having thus fully set forth the nature and merits of this invention, what is claimed as new is—

1. The carbureting of air for lighting and heating purposes by driving a current of the same through a metallic chamber filled with absorbent material saturated with gasoline or other carbon oil by means of a fan-blower, as is hereinbefore specified.

2. An apparatus for producing light or heat, consisting of a vessel or chamber filled with absorbent material saturated with gasoline or other carbon fluid, and of a fan-blower for forcing air through said saturated material, substantially as herein shown and described.

In testimony whereof I have on this 4th day of December, 1869, hereunto affixed my name in the presence of two witnesses.

BLAKEY PILKINGTON.

Witnesses:
GEO. S. PRINDLE,
SAML. S. MARR.